Figure 1:
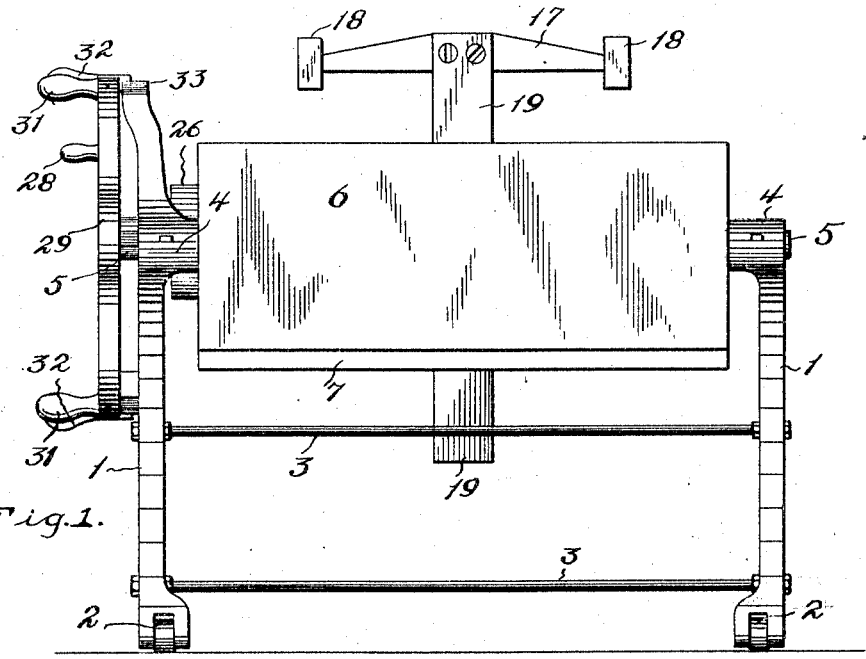

No. 788,739. PATENTED MAY 2, 1905.
C. P. THROCKMORTON.
MACHINE FOR MOLDING PLASTIC BLOCKS.
APPLICATION FILED SEPT. 17, 1904.

3 SHEETS—SHEET 1.

WITNESSES:
C. Stoughton.

INVENTOR
Charles P. Throckmorton
BY
Shepherd & Parr
ATTORNEYS.

No. 788,739. PATENTED MAY 2, 1905.
C. P. THROCKMORTON.
MACHINE FOR MOLDING PLASTIC BLOCKS.
APPLICATION FILED SEPT. 17, 1904.

3 SHEETS—SHEET 2.

WITNESSES:
C. Stoughton.

INVENTOR
Charles P. Throckmorton

BY
ATTORNEYS.

No. 788,739. PATENTED MAY 2, 1905.
C. P. THROCKMORTON.
MACHINE FOR MOLDING PLASTIC BLOCKS.
APPLICATION FILED SEPT. 17, 1904.

3 SHEETS—SHEET 3.

WITNESSES:
C. Stoughton.

INVENTOR
Charles P. Throckmorton

BY
Shepherd & Parker
ATTORNEYS

No. 788,739.

Patented May 2, 1905.

UNITED STATES PATENT OFFICE.

CHARLES P. THROCKMORTON, OF COLUMBUS, OHIO.

MACHINE FOR MOLDING PLASTIC BLOCKS.

SPECIFICATION forming part of Letters Patent No. 788,739, dated May 2, 1905.

Application filed September 17, 1904. Serial No. 224,906.

*To all whom it may concern:*

Be it known that I, CHARLES P. THROCKMORTON, a citizen of the United States, residing at Columbus, in the county of Franklin and State of Ohio, have invented a certain new and useful Improvement in Machines for Molding Plastic Blocks, of which the following is a specification.

My invention relates to a new and useful improvement in machines for molding plastic blocks.

The object of the invention is to provide automatic means for releasing the block when the mold-box is inverted.

A further object lies in the provision of means for continuously operating the machine and also in means for preventing the accidental displacement of the block or portions thereof when the mold-box is being inverted.

Finally, the object of the invention is to provide a device of the character described that will be strong, durable, efficient, and simple to make and one in which the several parts will not be liable to get out of working order.

With the above and other objects in view the invention consists of the novel details of construction and operation, a preferable embodiment of which is described in the specification and illustrated in the drawings, wherein—

Figure 2:
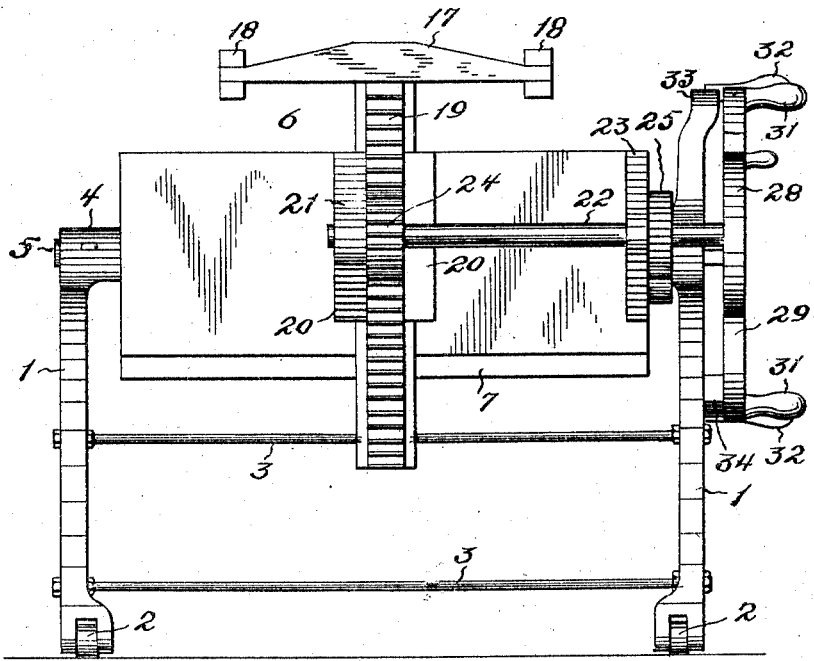
Figure 3:
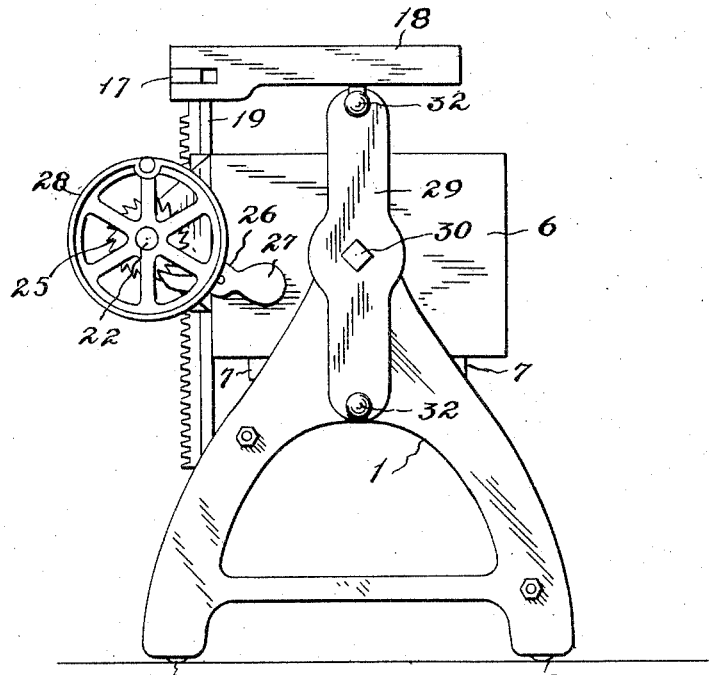
Figure 4:
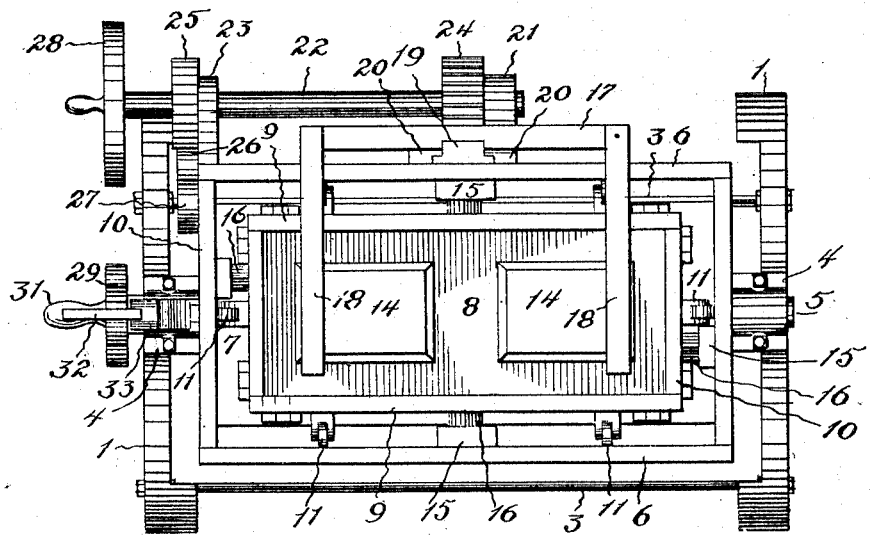
Figure 5:
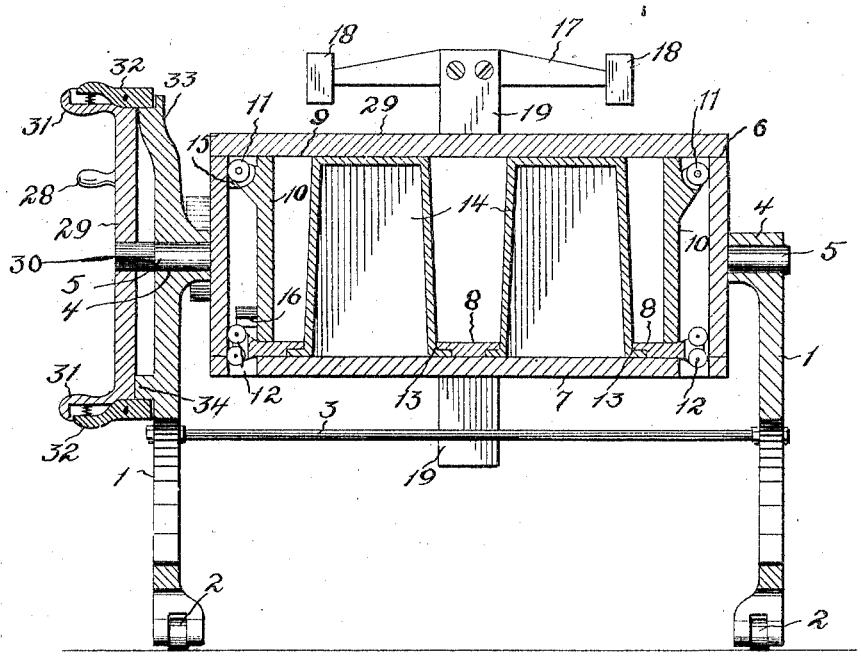
Figure 6:
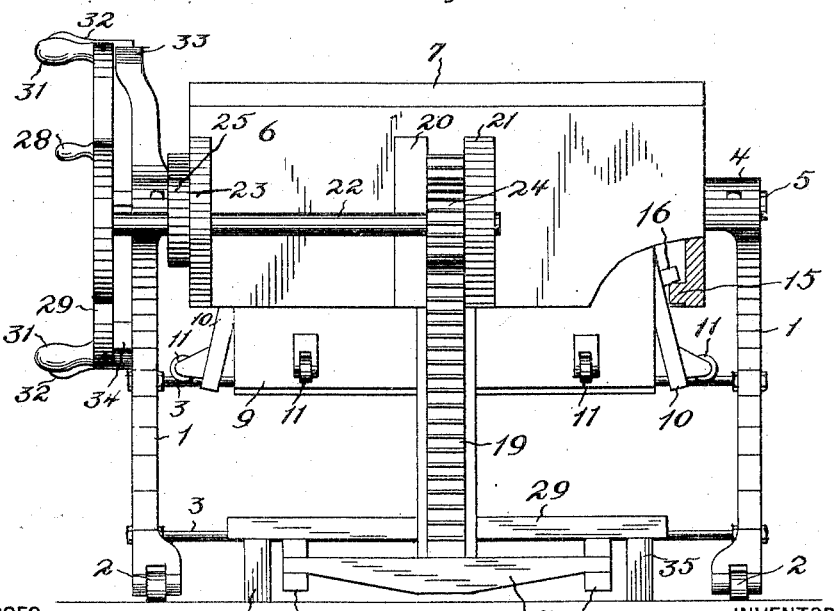

Figure 1 is a front elevation of the machine. Fig. 2 is a rear elevation. Fig. 3 is an end elevation. Fig. 4 is a plan view. Fig. 5 is a longitudinal vertical sectional view, and Fig. 6 is an elevation showing the mold-box inverted and the pallet lowered.

In the drawings the numeral 1 designates suitable standards provided with wheels or casters 2, by which they are movably supported, which standards are connected by means of suitable brace-rods 3, so positioned as not to interfere with the proper working of the machine. Each of the standards is formed with bearing-boxes 4, which rotatably support the trunnions 5 of a mold-box frame 6, provided with a suitable bottom 7, upon which normally rests the bottom 8 of the mold-box. The mold-box is composed of wing-plates 9 and end doors 10, provided with suitable rollers 11 near their upper ends, which normally contact with the inner surfaces of the frame 6. Rollers 12, projecting from the bottom plate 8 upon the outside of the end doors 10, and wing-plates 9 also contact with the inner surfaces of the said frame 6. The bottom 8 of the mold-box is provided with a plurality of openings 13, through which project the tapering cores 14, securely mounted upon the bottom 7 of the frame, thus constituting fixed cores and a movable mold-box. The frame 6 is provided with bosses 15, one disposed opposite each of the end doors and wing-plates. Tripping-lugs 16 are formed on the outsides of the side plates and doors in such position as to contact with the bosses 15 when the mold-box drops. It is readily seen that when the frame 6 is inverted the mold-box will drop to the position shown in Fig. 6, the rollers 11 and 12 acting as guides to prevent wabbling of the box and the tripping-lugs 16 contacting with the bosses 15 to open the plates and doors to release the block, which, as is obvious, drops from the tapering cores, which, as before stated, are fixed to the bottom plate 7 of the frame.

For the purpose of controlling the mold-box and properly removing the block therefrom I provide the cross-head 17, provided with the forwardly-extending arms 18, which are pivoted thereon so that they may be readily swung over or away from the mold-box and frame. The cross-head is supported upon a vertically-disposed rack-bar 19, operating in guides 20, mounted on the rear of the frame 6. A boxing 21 projects from one of the guides and supports a shaft 22, which is supported at its opposite end in a hanger 23, projecting from the corner of the said mold-box frame. The shaft 22 has fixed thereon a pinion 24 in engagement with the rack and a ratchet-wheel 25, engaged by a pawl 26, carrying a weighted end 27. A hand-wheel 28, fixedly mounted on the outer end of the shaft 22, provides means for rotating said shaft, whereby the cross-head and arms are raised and lowered. A pallet 29, upon which the block is deposited, is placed on top of the mold-box after the same has been filled and the arms 18 are brought to bear thereon by manipulation of the hand-wheel 28 and the pinion 24 and rack-bar 19. It is thus apparent that the pallet and the molded block, as well as the mold-box, are securely held in position while the mold-box frame 6 is being inverted. The inverting of the mold-box frame is performed by means of a double crank-arm 29, mounted upon the squared end 30 of one of the trunnions 5. It is to be understood that the crank-arm may be arranged at either end of the mold-box and that crank-arms may, if desired, be arranged at both ends. The crank-arm 29 is provided at each end with handles 31, in which are arranged spring-pressed pawls 32, which project beyond the crank-arm and engage in the bifurcated end of the extension 33, mounted on the standard 1, and the recessed lug 34, also mounted upon said standard. It is readily apparent that the pawls may engage in either the extension 33 or the lug 34, as clearly shown in Figs. 5 and 6.

The operation of my machine is as follows: The parts being normally in the positions shown in Fig. 5, except that the arms 18 are swung to each side, the material from which the block is to be molded is placed in the mold-box and tamped down until the same is filled. The pallet 29 is then placed upon the mold-box and the arms 18 swung thereover. The hand-wheel is now turned and the arms lowered onto the pallet, thus firmly holding the same in contact with the top of the mold-box. The pawl 26 engaging in the ratchet-wheel 25 prevents movement of the rack-bar during the turning or inverting of the parts. The mold-box and frame are now ready to be inverted and the operator grasping the handles 31 and pressing the pawls 32 so as to withdraw them from engagement with the extension 33 and lug 34 inverts or turns over the said frame and box. When the parts have been completely turned upside down, the pressure on the pawls is released, which allows them to spring into the recessed lug 34 and bifurcated end of the extension 33. At the same time the weighted end 27 of the pawl 26 forces the said pawl out of engagement with the ratchet-wheel 25, and thus allows the shaft 22 to be rotated by means of the hand-wheel 28 and the arms 18, supporting the pallet 29, to be lowered. As the arms 18 are lowered the mold-box and the block move downward, said mold-box being guided by the rollers 11 and 12, which prevent jarring of the block. As the mold-box moves downward the tripping-lugs 16 contact with the bosses 15, and thus throw open the end doors and wing-plates, arresting the mold-box and allowing the block to freely continue its downward course upon the pallet 29. Directly beneath the machine, so as to suitably support the pallet, I arrange sills 35, having a considerable length. The pallet is lowered until it rests upon these sills, and the mold-box and frame are then returned to their normal positions. It will be understood that the movement and operation of the mold-box is entirely automatic, as when the frame 6 is swung back to its original position the mold-box will through its own weight return to the bottom of the frame, and it will have already been observed that the downward movement and opening of the doors and plates of the box is also entirely automatic. When the parts have been returned to their normal positions, the machine may be bodily moved upon its wheels or casters 2 and the block allowed to remain where it was delivered. The operation of forming other blocks may then be repeated, and it is thus seen that a continuous operation is had.

I do not wish to limit myself to the exact details of construction herein set forth, as I may make various changes in the same without departing from the spirit of my invention.

Having now fully described my invention, what I claim, and desire to secure by Letters Patent, is—

1. In a machine of the type set forth, the combination with an invertible frame and fixed cores, of a movable mold-box.

2. In a device of the type set forth, the combination with an invertible frame and fixed cores, of a movable mold-box, and automatic means for opening said mold-box.

3. In a device of the type set forth, the combination with an invertible frame and fixed cores, of a movable mold-box, and movable delivery means acting in conjunction with the said mold-box.

4. In a device of the type set forth, the combination with an invertible frame, cores fixed on said frame, means for inverting the frame, a movable mold-box mounted in the frame about the cores, movable delivery means mounted on the frame, and automatic means for opening the mold-box when the frame is inverted.

5. In a device of the type set forth, the combination with an invertible frame, and a movable mold-box, of a delivery device comprising supporting means, a rack-bar connected to the supporting means, and means supported from the frame for raising and lowering the rack-bar.

6. In a device of the type set forth, the combination with an invertible mold-box frame, of means for inverting the mold-box frame comprising a crank-arm connected to the said frame, locking means carried by the crank-arm, and stops adapted to be engaged by the locking means to hold the parts against movement.

7. In a device of the type set forth, the combination with an invertible mold-box frame having projections and fixed cores, of a movable mold-box comprising a bottom plate, guiding means extending from the bottom plate, hinged sides mounted upon the bottom plate having projections therefrom adapted to engage with the first-named projections when the mold-box is moved, and guiding means arranged upon the upper ends of the sides.

CHARLES P. THROCKMORTON.

In presence of—
C. STOUGHTON,
M. B. SCHLEY.